US00RE36846E

United States Patent [19]

Ng et al.

[11] E Patent Number: Re. 36,846

[45] Reissued Date of Patent: Aug. 29, 2000

[54] RECOVERY FROM ERRORS IN A REDUNDANT ARRAY OF DISK DRIVES

[75] Inventors: Spencer W. Ng, San Jose, Calif.; David W. Palmer, Longmont, Colo.; Richard S. Thompson, Falls Church, Va.

[73] Assignee: International Business Machines Corporation, Armonk, N.Y.

[21] Appl. No.: 08/583,773

[22] Filed: Jan. 11, 1996

Related U.S. Patent Documents

Reissue of:

[64] Patent No.: 5,278,838
Issued: Jan. 11, 1994
Appl. No.: 07/717,263
Filed: Jun. 18, 1991

[51] Int. Cl.[7] ..... G06F 11/00

[52] U.S. Cl. ..... 714/6

[58] Field of Search ..... 395/182.04, 182.05, 395/183.18

[56] References Cited

U.S. PATENT DOCUMENTS

| | | | |
|---|---|---|---|
| 4,092,732 | 5/1978 | Ouchi | 364/900 |
| 4,761,785 | 8/1988 | Clark et al. | 371/51 |
| 4,775,978 | 10/1988 | Hartness . | |
| 4,855,907 | 8/1989 | Ferro et al. | 364/300 |
| 4,870,643 | 9/1989 | Bultman et al. . | |
| 5,101,492 | 3/1992 | Schultz et al. . | |
| 5,179,704 | 1/1993 | Jibbe et al. | 395/725 |
| 5,195,100 | 3/1993 | Katz et al. | 371/66 |
| 5,208,813 | 5/1993 | Stallmo | 371/10.1 |

FOREIGN PATENT DOCUMENTS 1296103 5/1988 Canada .

OTHER PUBLICATIONS

Patterson et al. "A Case for Redundant Arrays of Inexpensive Disks(RAID)" ACM 1988 Mar. 1988 pp. 109–116.

*Primary Examiner*—Vincent P. Canney
*Attorney, Agent, or Firm*—Morgan & Finnegan

[57] ABSTRACT

Fault tolerance in a redundant array of disk drives is degraded when error conditions exist in the array. Several methods for rebuilding data of the array to remove the degradation are described. Data rebuilding for entire disk drives and partial data rebuilds of disk drives are described. All rebuild methods tend to reduce the negative affect of using array resources for the data rebuild. In one method rebuilding occurs during idle time of the array. In a second method rebuilding is interleaved between current data area accessing operations of the array at a rate which is inversely proportional to activity level of the array. In a third method, the data are rebuilt when a data area being accessed is a data area needing rebuilding.

62 Claims, 4 Drawing Sheets

RECOVERY FROM ERRORS IN A REDUNDANT ARRAY OF DISK DRIVES

Matter enclosed in heavy brackets [ ] appears in the original patent but forms no part of this reissue specification; matter printed in italics indicates the additions made by reissue.

FIELD OF THE INVENTION

The present invention relates to redundant arrays of disk drives, particularly to recovery from degraded redundancy by rebuilding data of error-affected tracks causing the degradation into spare tracks or disks.

BACKGROUND OF THE INVENTION

Patterson et al in the article "A CASE FOR REDUNDANT ARRAYS OF INEXPENSIVE DISKS (RAID)", ACM 1988, Mar. 1988, describe several arrangements for using a plurality of data-storing disk drives. Various modes of operation are described; in one mode the data storage is divided among the several drives to effect a storage redundancy. Data to be stored is partially stored in a predetermined number of the disk drives in the array, at least one of the disk drives storing error detecting redundancies. For example, four of the disk drives may store data while a fifth disk drive may store parity based upon data stored in the four disk drives. Such a redundant array of disk drives may provide high data availability by introducing error detecting redundancy data in one of the disk drives. For example, four data blocks (one data block in each of the four drives) are used to compute an error detecting redundancy, such as a parity value; the computed error detecting redundancy is stored as a fifth block on the fifth drive. All blocks have the same number of data bytes and may be (not a requirement) stored in the five disk drives at the same relative track locations. The five drives form a parity group of drives. If any one of the drives in the parity group fails, in whole or in part, the data from the failing drive can be reconstructed using known error correcting techniques. It is desired to efficiently rebuild and replace the data from the failing disk drive while continuing accessing the drives in the array for data processing operations.

The disk drives in a parity group of drives may act in unison as a single logical disk drive. Such a logical drive has logical cylinders and tracks consisting of like-located cylinders and tracks in the parity group drives. In such array usage, the data being stored is partially stored in each of the data-storing drives in an interleaved manner in a so-called striped mode. Alternately, the disk drives and their data in the parity group may be independently addressable and used in a so-called independent mode.

Whenever one of the disk drives in a single-parity array fails, even though data can be successfully recovered, the fault tolerance to error conditions is lost. To return to a desired fault tolerant state, the failing disk drive should be replaced or repaired and the affected data content rebuilt to the desired redundancy. It is desired to provide control means and methods for effecting such rebuilding of data and its redundancy to remove the error from a partially or wholly failed disk drive in a parity array of disk drives.

SUMMARY OF THE INVENTION

It is an object of the invention to complete rebuild of data in a parity group of disk drives to a fault tolerant state after detecting loss or degradation of the fault tolerant state by a partially or wholly failed disk drive in a parity array of disk drives.

It is another object of the invention to complete a rebuild of data to a fault tolerant state in a relatively non-intrusive manner while accesses to a parity array continue for data storage and retrieval.

In accordance with the invention, failures in a redundant array of disk drives is remedied by rebuilding the error-affected data using any one of a plurality of methods and apparatus any of which enable a continuing use of the disk drive array for information handling and data processing. Such rebuilding may use any or all of the methods and apparatus. A first method and apparatus is a variable rate rebuild which schedules rebuilds at a rate in a detected inverse ratio to a current or pending rate of disk drive usage or accessing within a parity group. Upon completing each scheduled rebuild, this method and apparatus also preferably takes advantage of any idle time of the array by continuing rebuild if there is no waiting access. A second method and apparatus effects rebuild during predetermined array idle times by starting a non-scheduled rebuild of a predetermined portion of the error-affected data. A third or opportunistic method and apparatus detects a need for a data rebuild during a usual access to the array. All three methods and apparatus are preferably used in conjunction with each other.

The above-described methods and apparatus rebuild data onto a scratch or new disk drive which replaces a disk drive in error. A purpose of the rebuild is to restore redundancy of the array. These methods and apparatus also apply to a partially failed disk drive in which the error-affected data are rebuilt in a different track or zone of the disk drive in error; in the latter rebuild, data in the non-failing disk drives may also be moved to corresponding zones or tracks in the respective drives.

The foregoing and other objects, features, and advantages of the invention will be apparent from the following more particular description of preferred embodiments of the invention, as illustrated in the accompanying drawings.

DETAILED DESCRIPTION

Figure 1:
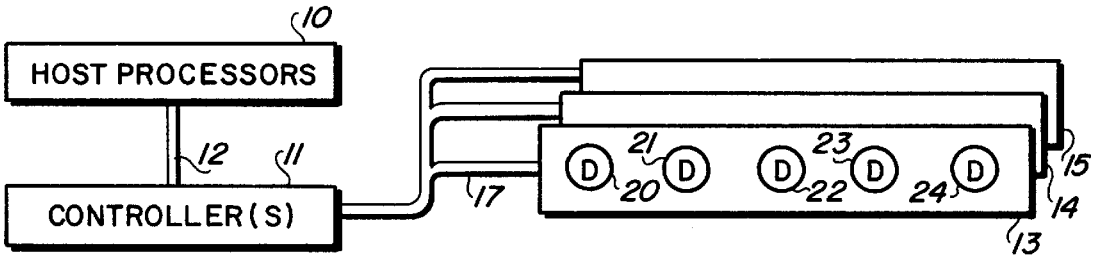
FIG. 1 illustrates in simplified form an information handling system employing the present invention.

Referring now more particularly to the appended drawing, like numerals indicate like parts and structural features in the various figures. Host processor(s) 10 (FIG. 1) are respectively connected to one or more controller(s) 11 by host to peripheral interconnection 12. A plurality of parity arrays 13, 14 and 15 are connected to controller 11 by a usual controller to peripheral device connection 17. Each of the FIG. 1 illustrated arrays 13–15 include five disk drives 20–24, no limitation thereto intended. Four of the disk drives 20–23 store like-sized blocks of data of one data unit. The block sizes may vary from data unit to data unit. A data unit can be an amalgamation of files, one file, graphic data, and the like. A fifth disk drive 24 is a parity or error detection redundancy storing drive P. The redundancy is a parity data block having the same size as the corresponding data blocks of the data unit. The redundancy is computed based upon any algorithm, including simple parity for example, using the data in the data blocks stored in drives 20–23. All data blocks of any data unit in disk drives 20–24 may be stored in the same relative tracks in all of the disk drives; i.e. all data blocks may be stored in track 16 of all the drives, for example; while this storage arrangement simplifies data management, it is not essential for practicing the present invention.

Disk drives 20–24 form a parity group, with disk 24 being dedicated to storing parity blocks. This general arrangement is known as RAID 3 and RAID 4 architecture, see Patterson et al, supra. Alternately, the storage of the parity block scan be rotated among all disk drives in the parity group with no single drive being designated as the parity drive. This latter storage arrangement is known as RAID 5 architecture. The present invention is equally applicable to any of these architectures, plus other architectures.

When storing data to any one or more of the disk drives 20–23, a new parity value is computed and stored in disk drive P 24. For efficiency purposes, it is desired to simultaneously record data in all four disk drives 20–23, compute parity and record parity on disk drive P 24 as the data are being stored on the data drives; in a rotated parity arrangement, parity data are stored in the appropriate disk drive.

Host processors 10 and controller 11 both participate in the above-described machine operations; it is to be understood that the combination of host processors 10 and controller 11 comprises a computer means in which programming resides and is actuated for effecting the practice of the present invention in the illustrated embodiment; such programming is represented by the machine operation charts of the various figures. Such programming can be a separate part of the FIG. 1 illustrated system or can be embodied in ROM, loadable software modules, and the like.

Rebuilding data in a parity group on a disk drive that replaces a failed disk drive, either a spare or true replacement is achieved using a combination of methods, first scheduled rebuilds are controlled by a variable rebuild rate method, an idle time rebuild occurs during any idle time of the parity array and an opportunistic rebuild method is invoked upon each access to a replacement drive for the failed drive for accessing a non-built data storing area. This description assumes that a failed drive (a drive having a number of non-recordable data storing tracks/clusters of sectors, a failed mechanical part that prevents accessing and the like is a failed drive) has been replace with a scratch drive or disk using known disk drive and disk replacement procedures.)

Figure 2:
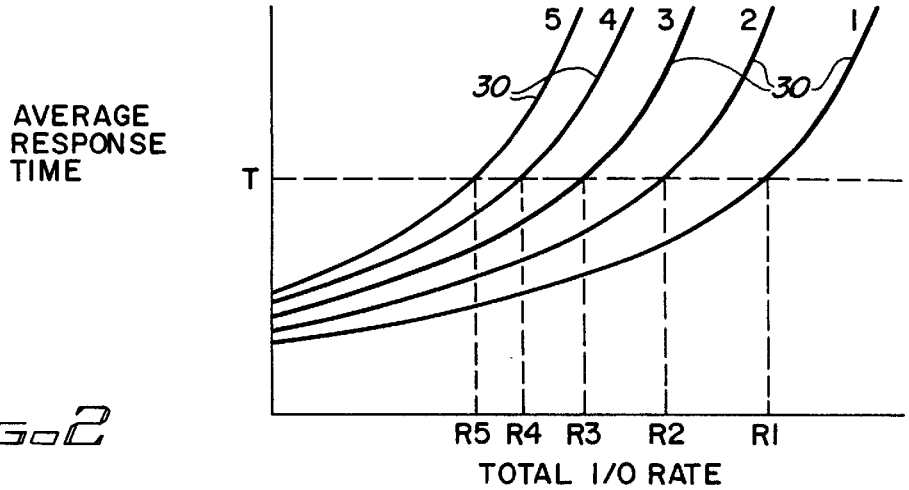
FIG. 2 is a graph illustrating the principles o variable rate rebuilding in the FIG. 1 illustrated array of disk drives.

Before proceeding with a detailed description of the methods, the principles of the variable rate rebuild method is described with respect to FIG. 2. When this method is active, rebuild disk accesses (input/output operations or I/O's) are commanded or scheduled at a rate which varies inversely to the current level of I/O activity. FIG. 2 illustrates how the rate of rebuild scheduling is ascertained. Such rebuilding is interleaved with host processor 10 or other disk drive accesses, as will become apparent. A desired response time T is determined for the parity group to be managed. Such a response time is determined using known system analysis techniques, or the rate can be arbitrary and capricious. The five curves 30, also respectively labelled 1–5, show the variation of average response time (vertical ordinate) with the total I/O rate represented on the horizontal ordinate. The total I/O rate is determined by the activity of the host processors 10. The I/O rate is repeatedly monitored in predetermined constant measurement periods. The measured I/O rate determines the rebuild rate for the next ensuing measurement period. The measured rate during each measurement period is the computed average I/O rate for the measurement period of the parity group. When the I/O rate is higher than R1, then no rebuilds are scheduled during the next ensuing measurement period. During such a measurement period rebuilds may occur using either the idle or the opportunistic rebuild methods. The rebuild schedule rate for one measurement period is next listed using the FIG. 2 chart as a guide. An I/O rate between R1 and R2, one rebuild is scheduled; upon measuring an I/O rate between R3 and R2, two rebuilds are scheduled; a measured I/O rate between R4 and R3 results in three rebuilds to be scheduled; a measured I/O rate between R5 and R4 results in four rebuilds being scheduled while lower I/O rates than R5 result in five rebuilds being scheduled. The maximum number of scheduled rebuilds is five; any number can be used as the maximum. In the illustrated embodiment, a minimum size rebuild is one track. The information represented by the FIG. 2 chart is maintained for the parity array in the computer means for effecting scheduled rebuilds.

Figure 3:
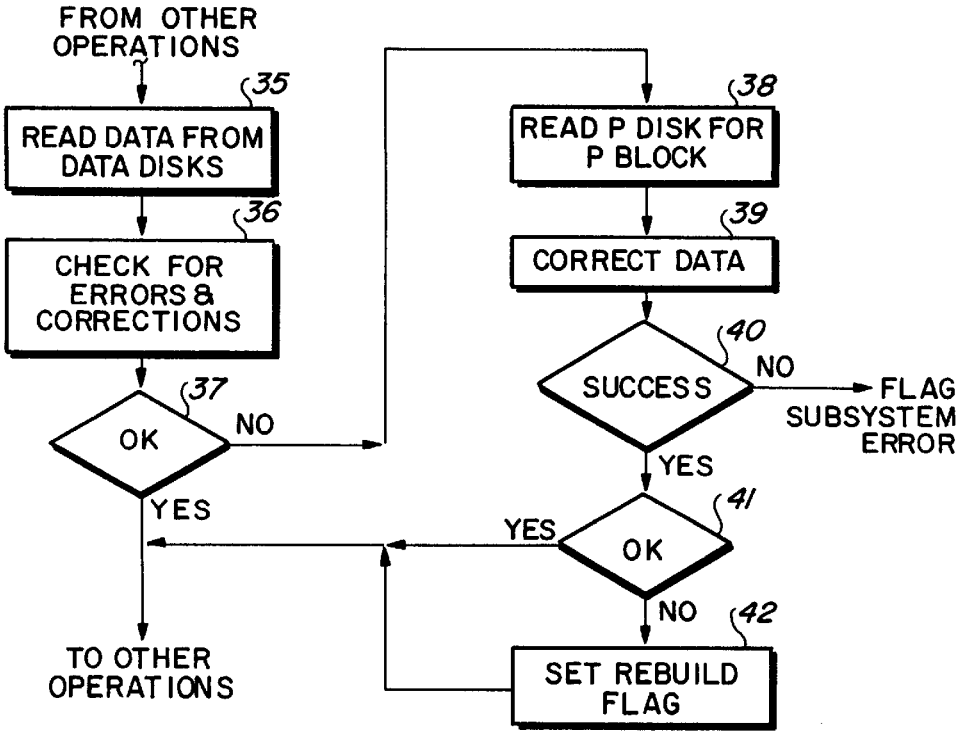
FIG. 3 is a machine operations chart showing detecting errors in the FIG. 1 illustrated array and priming the system for rebuilding.

FIG. 3 illustrates reading data from one of the parity arrays 13–15, detecting rebuild criteria and priming the FIG. 1 illustrated system for rebuilding data. A usual read operation occurs at machine step 35 as initiated by other machine operations. At machine step 36 controller 11 (disk drives may contain error detecting facilities as well as the controller or host processors) detects errors in the data read from any of the disk drives 20–23; such errors are attempted to be corrected in a usual manner. At machine decision step 37, controller 11 determines whether or not the error corrections by the error redundancies in the individual disk drives 20–23 were successful and whether or not fault tolerance was degraded even with a successful error correction. If error corrections were successful (high quality redundancy may still be indicated for some purposes and degraded redundancy may be indicated for other purposes, as will become apparent), then, assuming fault tolerant redundancy is not degraded for requiring a rebuild (NO degradation detected in machine step 37), machine operations proceed to other operations; no rebuild activity is indicated. On the other hand, if any one of the disk drives did not yield correctable data errors, which include a failure to respond, fault tolerance degradation is indicated. With the parity disk P 24, such data errors can still be corrected by reading the parity redundancy of the block from disk drive P 24, then computing the correct data from the data successfully read from the other drives and the parity redundancy. To achieve this known parity correction, the parity block stored in disk drive P 24 is read into controller 11. Then the data are corrected in machine step 39 using the known parity correction procedures. Such correction can occur in either a host processor 10 or in controller 11. At this point in time, the redundancy for the data unit being read has been removed. Then, at machine step 40, the parity correcting unit (host processor 10/controller 11) determines whether or not the parity correction is successful. Whenever the parity correction is unsuccessful, a subsystem error is flagged in a usual manner. Then, recovery procedures beyond the present description are required. Whenever the parity correction is successful, then at machine step 41, if it is determined that there is insufficient degradation of the fault tolerance effecting redundancy, other machine operations are performed; if it is determined that fault tolerance is unacceptable (a disk has failed, for example), then a rebuild is indicated.

Figure 4:
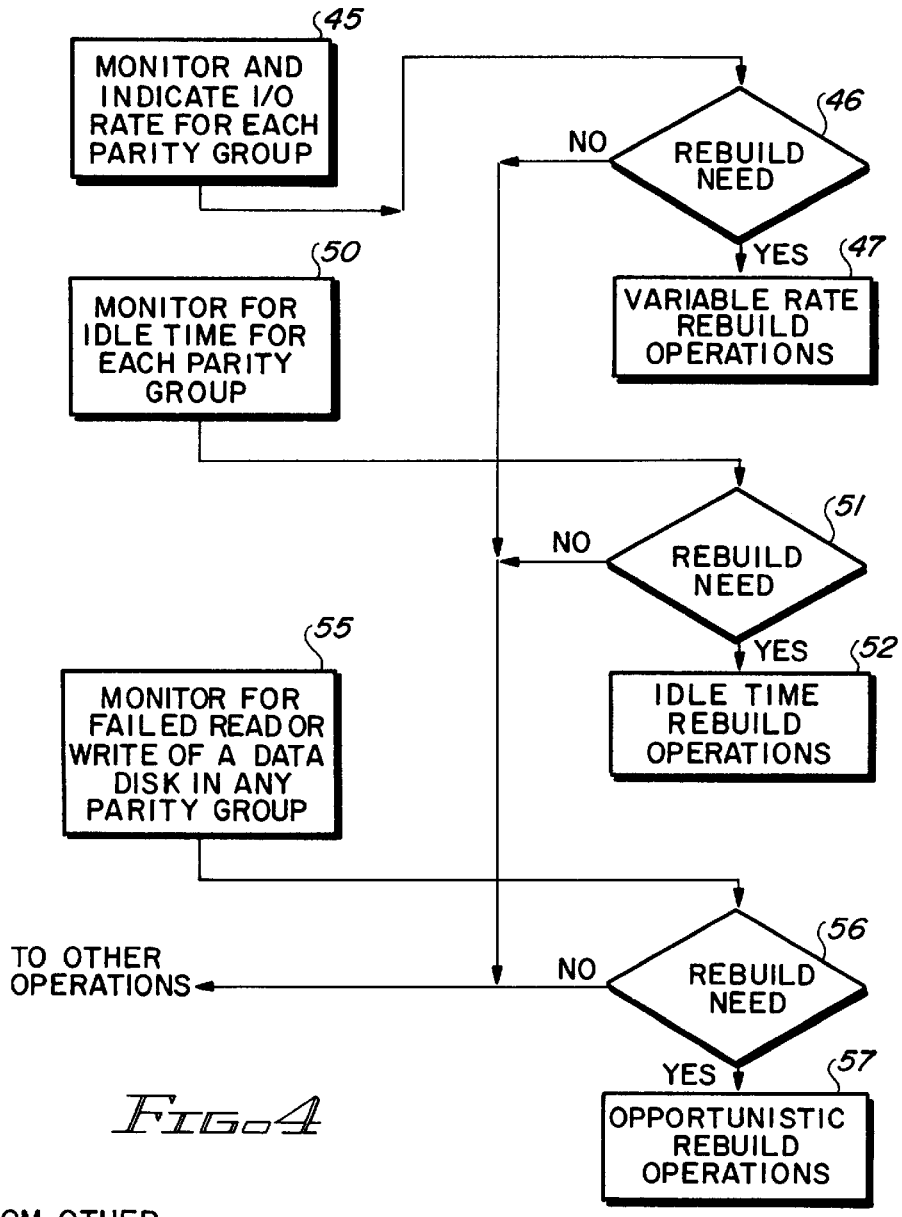
FIG. 4 is a machine operations chart showing activating any one of three rebuild methods or apparatus.
Figure 8:
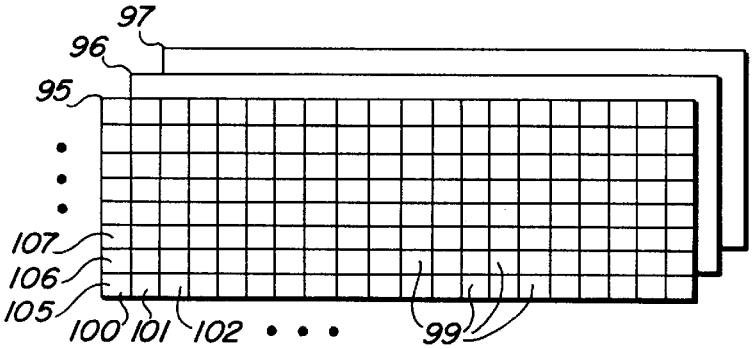
FIG. 8 is a diagrammatic showing of a bit map control for effecting rebuild.

The present invention enables maintaining the desired redundancy without undue interference with day-to-day operations. FIG. 4 illustrates the concepts of the present embodiment of the invention. The general arrangement of FIG. 4 can be thought of as establishing an interrupt driven examination of rebuild needs in a system. Machine step 45 represents monitoring and indicating I/O (input output) rate of operations for each parity group 13–15 of disk drives. At predetermined times, as will become apparent from FIG. 9, from such rate monitoring and indicating, a rebuild need is detected at machine step 46. Such detection may merely be a global rebuild flag or any entry in any of the FIG. 8 illustrated bit maps. If a rebuild is needed, then at machine step 47 a later described valuable rate rebuild is scheduled. If a rebuild is not needed, then other machine operations are performed.

Similarly, machine step 50 represents monitoring for idle time for idle time in any one of the parity groups 13–15. If idle time is detected, such as no pending access requests nor free standing operations are being performed, then machine step 51 represents detecting a rebuild need. When a rebuild need is detected, then at machine step 52 a later-described idle time rebuild is effected. If no rebuild is required, other machine operations ensue.

Likewise, machine step 55 represents monitoring for a failed access, read operation or write operation in any one of the parity groups 13–15 or any access to a known failed drive. Upon detecting such an error, a rebuild need may be indicated as described for FIG. 3. Then at machine step 56 the rebuild needs are detected. On one hand, if the parity correction described in FIG. 3 was successful, a rebuild may be deferred, then from machine step 56 other operations ensue. If a rebuild is required, then the later-described opportunistic rebuild operations of machine step 57 are performed.

It is to be appreciated that the FIG. 4 illustration is tutorial; actual practical embodiments may differ in substantial details without departing from the principles of the present invention. Interleaving the plural rebuild techniques can follow several variations. The determination of when and the total extent of a rebuild may substantially affect a given design.

Figure 5:
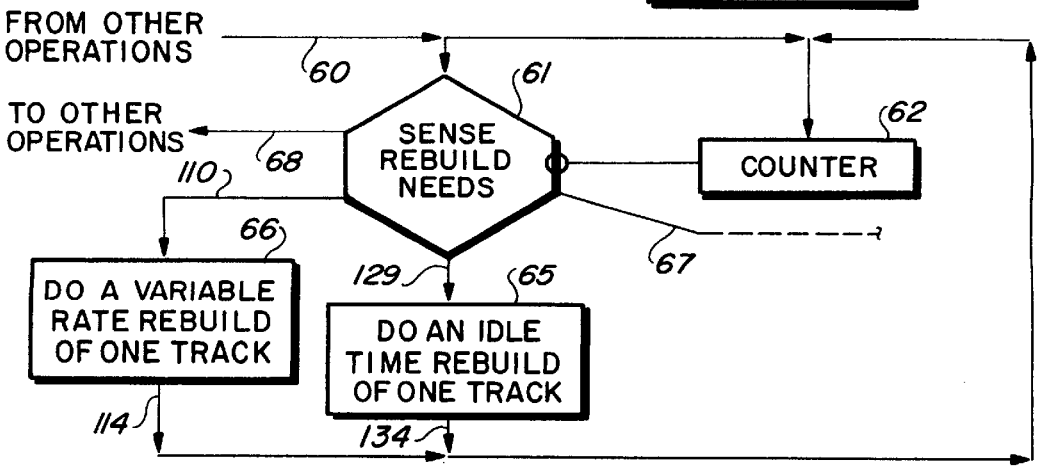
FIG. 5 is a simplified machine operations chart showing selection of a rebuild method and apparatus.

FIG. 5 shows one method of selecting between two of the three illustrated data rebuild techniques. The selection procedure is entered at path 60 from other machine operations based upon any one of a plurality of criteria, such as a time out, time of day, number of accesses, the later-described rebuild schedule of the variable rate rebuild, whether or not bit map of FIG. 8 indicates any rebuild need and the like. Such a selection could typically reside in a dispatcher or other supervisory program (not shown). At machine decision or branching step 61, the type of rebuild needed to be evaluated is selected. Machine step 61 represents a program loop function controlled by software counter 62. Entry of the procedure at path 60 resets counter 62 to a reference state, counter 62 enables the decision step 61 to first evaluate an idle rebuild at machine step 65 as detailed in FIG. 10. If none of the parity arrays 13–15 are idle or there is no need for any rebuild (bit maps of FIG. 8 are all zeros), then operations return to machine step 61, counter 62 is incremented to a next value. This next value causes decision step 61 to effect evaluation of a variable rate rebuild at machine step 66 as detailed later in FIG. 9. The rebuild scanning may return to FIG. 5 from FIG. 9 to reexecute machine step 61 and increment counter 62. Other rebuild procedures may be employed (not described) as represented by numeral 67. Again, upon completing the rebuild evaluation, machine operations returning to the FIG. 5 procedure results in another incrementation of counter 62 and execution of machine step 61. Since the program loop scanning of the procedures has been completed, other machine operations are performed as indicated by numeral 68. The order of scanning the rebuild procedures or methods is arbitrary. As shown in FIG. 11, the opportunistic rebuild procedure is always entered from a disk accessing operation. Any method of scanning rebuild procedures may be employed for selecting any one of a plurality of rebuild procedures.

Figure 6:
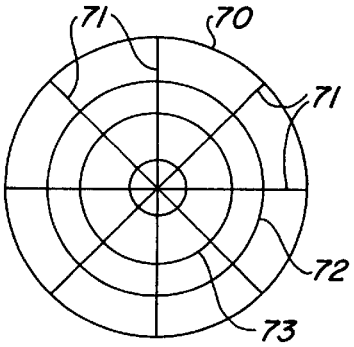
FIG. 6 is a diagrammatic showing of a disk recording surface as may be used in practicing the present invention.

FIG. 6 is a diagrammatic plan view of a disk in any of the disk devices 20–24; a plurality of such disks are usually stacked to be coaxially co-rotating in the respective devices. All tracks on the respective disks having the same radial location constitute a cylinder of such tracks. When employing a traditional fixed block architecture, each disk 70 may be envisioned as a plurality of disk sector-indicating radially-extending machine-sensible lines 71. Each disk sector between the lines is addressable as a data-storing unit. In a count-key-data (CKD) disk a single radially-extending track index line is used. Each disk has a multiplicity of addressable circular tracks, or circumvolutions of a spiral track, reside on each disk 70. A track 72 may be error affected requiring a partial rebuild of the array. In disk 70 the data contents of the error affected track 72 may be reassigned to track 73; in a rebuild the data contents of all tracks 72 in the respective disk devices 20–24 are similarly reassigned to their respective tracks 73. In one mode, the data contents of a cylinder of tracks in which track 72 may be reassigned to a cylinder of tracks including track 73. In another mode, only the contents of a single track are reassigned. When a disk device is totally replaced, then the data from all of the remaining devices 20–24 are used to compute the data for the replaced disk. The decision when to replace a disk device that is partially operable may be based upon the number of unusable or bad tracks on the device, the character of the error causing failure, and the like.

Figure 7:
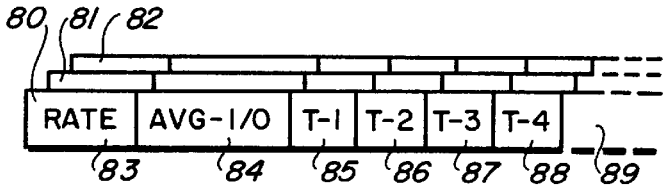
FIG. 7 is a diagrammatic showing of a data structure usable in practicing the present invention.

FIG. 7 illustrates a data structure for one implementation of the variable rate rebuild method. The objective of this method is to maintain during the rebuild period at least a minimum level of subsystem performance, i.e. response time to received I/O requests. Three registers or data storage locations 80–82, either in a host processor 10 or controller 11, store control information need to effect the variable rate rebuild method in the respective parity arrays 13–15. Each register 80–82 is identically constructed, the criteria information may be different to accommodate arrays having different performance characteristics or system usages. Field rate 83 stores a number indicating the rate of rebuild, i.e. one rebuild per second, two per second, etc. Field AVG-IO 84 stores the average I/O response time, possibly expressed in terms of its corresponding I/O request rate, in a predetermined measuring period. The I/O response time or request rate is used to compute the rebuild rate. Fields 85–88 respectively store rebuild rates for the I/O request rates T-1 through T-4 for various rebuild rates, no limitation thereto intended. The total number of disk accesses to a parity array is an indication of response; the greater the number of access requests, the lower the desired rebuild rate. Thresholds T-1 through T-4 correspond to decreasing numbers of access requests rates and indicate higher and higher rebuild rates. Threshold T-1 indicates an access rate greater than which would result in no rebuild being permitted by the variable rate rebuild method. Threshold T-2 indicates an access rate greater than T-3 and smaller than T-1 and which permits one rebuild access (i.e. rebuild one track of data) during a constant request rate measuring period. Similarly, threshold T-3 indicates an access rate greater than T-4 and smaller than T-2 and which permits two rebuild accesses during the constant rebuild rate measuring period. As request rates continue to decrease, corresponding increases in rebuild rates occur. A predetermined maximum rebuild rate for the system may be established. In another implementation of the variable rate rebuild method, an average response time can be directly measured during each successive measuring period. If the measured response time is slower than a desired response time, the rebuild rate to be used during the next successive measuring period is reduced. If the measured response time is shorter than the desired response time, the rebuild rate used in the next successive measuring period is increased. Alternately, if I/O access queues exist, then the rebuild rate may be selected to be inversely proportional to the length of the access queues for the respective parity arrays. Any of the above-described measurement techniques may be employed for establishing the rebuild rate control information stored in fields 83 and 84. Numeral 89 indicates that additional criteria may be used for determining a rebuild rate which is inversely proportional to accessing/free-standing array operations.

Which tracks needing rebuild are maintained in bit maps 95–97 (FIG. 8) respectively for parity arrays 13–15. The rows 105, 106, 107 ... of bit-containing squares 99 respectively indicate sets of logical tracks on one recording surface of disk 70 (FIG. 6). The columns 100, 101, 102 ... of bit-containing squares 99 respectively represent logical cylinders of the logical tracks. Each logical track includes one physical track in each device 20–24 and each logical cylinder includes one physical cylinder in each device 20–24. When any one of the parity groups 13–15 is providing complete redundancy, then all of the squares 99 in the respective bit map 95–97 contains binary 0's. Any track needing a rebuild, whether as part of a complete rebuild of a disk device or a partial rebuild, is indicated by a binary 1 in the square or bit position 99 of the respective bit map. Scanning the bit maps for ascertaining rebuild needs follows known techniques. An index or written-to-bit-map value (not shown) may be used to indicate that a respective bit map either contains at least a binary 1, all binary 0's or the number of binary 1's in each respective bit map.

Figure 9:
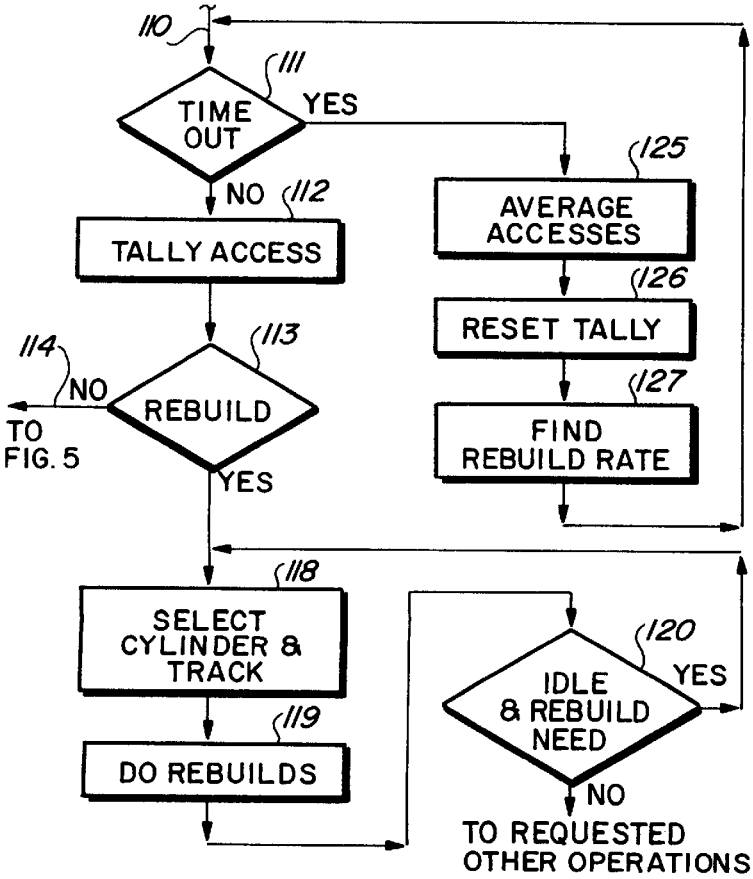
FIG. 9 is a machine operations chart showing rebuild using a variable rate method and apparatus.

FIG. 9 illustrates one implementation of the variable rate rebuild method, including generating the control information for the FIG. 7 data structure. The description is for one of the parity arrays; modifying the machine operations to accommodate a plurality of parity arrays can be achieved in any one of several approaches. For example, only one of the three arrays 13–15 may have a non-zero bit map; then only array indicated by the non-zero bit map is processed. If a plurality of bit maps are non-zero, priority of rebuilding in the three arrays can be based upon the least busy array, a designation of relative importance of the arrays to continued successful system operations, and the like. In any event, entry of the FIG. 9 illustrated machine operations is over path 110 from either FIG. 4 or 5, the present description assumed entry from FIG. 5. At machine step 111 whether or not a measurement period has timed out is sensed. If a measurement period did not time out, then at machine step 112 the access tally is updated (other rebuild rate indicating criteria may be updated as well). Following the update, at machine decision step 113 field 83 is examined along with an elapsed time indication. Elapsed time is computed from the time of day the last rebuild for the parity error was completed, such as indicated by numeral 89 of FIG. 7. By way of design, such last rebuild is the last rebuild by any of the methods being used, the last rebuild of either the idle or variable rate rebuild method or the last rebuild achieved by the variable rate rebuild method. If the time for rebuild has not been reached, then the FIG. 5 illustrated scanning procedure is reentered. If a rebuild is to be scheduled, then at machine step 118 the cylinder and track(s) to be rebuilt are selected. In making the cylinder and track selection, it is desired to minimize seek times to reach a track(s) to be rebuilt. For a striped mode array, since the track access mechanisms (not separately shown) of the drives in each parity array always have a common radial position over disks 70 of the respective devices 20–24 (scanning a track in a current logical cylinder comprising all physical cylinders in the parity group devices at a same radial position), a track in the current cylinder or in a cylinder having a closest radial proximity to the current cylinder is selected. Such track(s) is identified by analysis of the array's FIG. 8 bit map. This analysis is straight forward and is not further described.

For a parity array operating in the independent mode, the same general approach is used. Each of the devices in the independent mode may be scanning tracks/cylinders having different radial positions. The track/cylinder to be rebuilt is the cylinder that is located at a mean radial position between a first device in the array having its access mechanism at a radial inwardmost position and a second device having its access mechanism at a radially outwardmost position or all the devices in the array. For example, if the first device has its access mechanism for scanning track 72 of FIG. 6, the second device has its access mechanism for scanning track 73 and the other two operational devices in the parity array have their respective access mechanisms positioned radially for scanning tracks radially intermediate between tracks 72 and 73, then the cylinder radially midway between tracks 72 and 73 is examined for rebuild. If the midway cylinder has no track to be rebuilt, then adjacent cylinders are successively examined at successively increasing radial distances from the midway cylinder This determination follows examining the cylinder which is next radially outward of the midway cylinder, thence if that cylinder has no track requiring rebuild, then the next radially inward cylinder is examined, etc.

After selecting the cylinder in machine step 118, a track(s) in the selected cylinder is rebuilt in machine step 119. This rebuilding is computing the data from the corresponding physical tracks in the other devices of the array; then storing the computed data into the selected track(s). Upon completion of the rebuilding, the respective bit position(s) of the array bit map of FIG. 8 is reset to 0. Then at machine step 120 whether or not the parity array is idle and there are still tracks to be rebuilt is checked. Whenever the array is idle and a track of the parity array still needs to be rebuilt, machine steps 118 and 119 are repeated until the array is no longer idle or all rebuilds have been completed, then other machine operations are performed.

Calculation of the variable rebuild rate occurs whenever the machine step 111 indicates the measurement period has expired. In one embodiment of computing the desired rebuild rate, at machine step 125 the number of accesses to the parity array are averaged to obtain an average access rate. Such averaging allows varying the measurement period without affecting other variables. The average rate is stored in field 84. Then the access tally is reset in machine step 126, such access tally may be stored in a register 80–82 as represented by numeral 89. In machine step 127 the rebuild rate is determined by comparing the access tally values in fields 85–88 with the field 84 value. Then the rebuild rate corresponding to the threshold field 85–88 having a value least less than the field 84 value is stored in field 83 as the new rebuild rate. Remember that T-1's rebuild rate is zero. If a queue length criterion is used, then the queue length(s) are examined and the rebuild rate corresponding to the respective queue lengths is selected. Of course, algorithmic calculations can be used rather than table lookup; such calculation results are rounded to a next lowest time slice or unit value.

Figure 10:
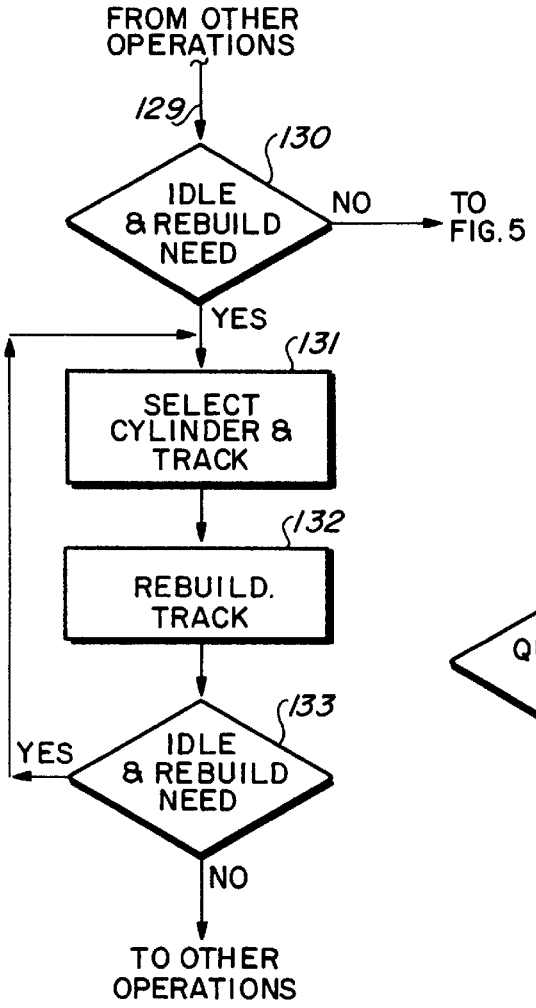
FIG. 10 is a machine operations chart showing rebuild using an array idle time method and apparatus.
Figure 11:
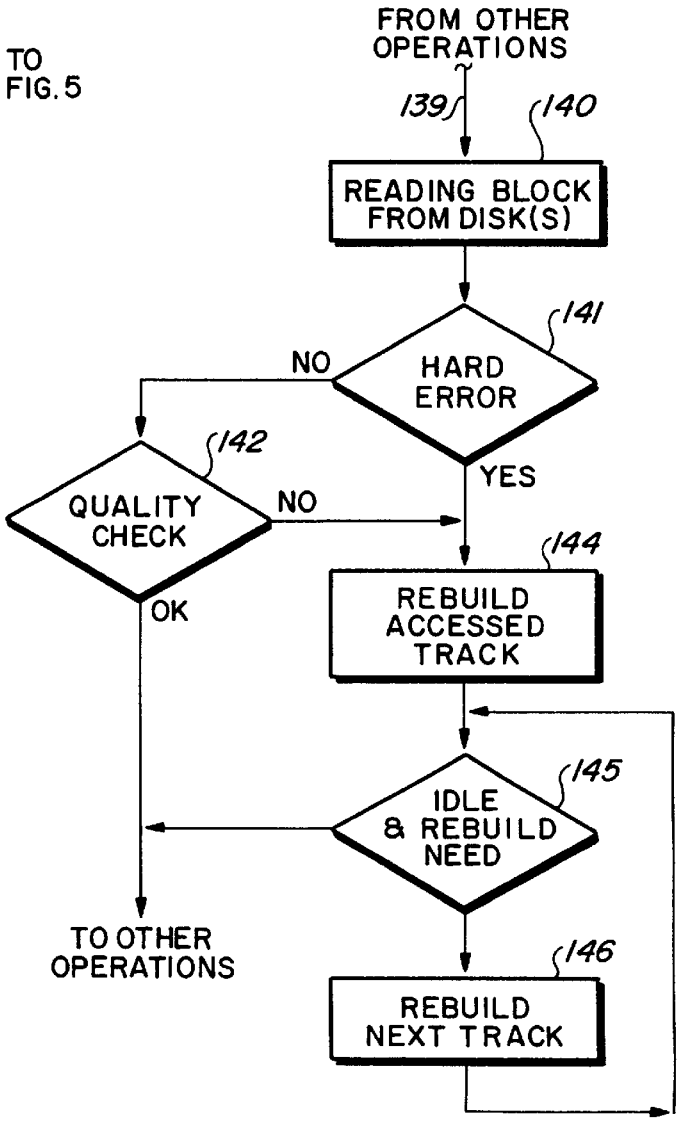
FIG. 11 is a machine operations chart showing rebuild using the opportunistic rebuild method and apparatus.

FIG. 10 illustrates one embodiment of the idle rebuild method. Entry into the method is from FIG. 4 or over path 129 from FIG. 5. Whether or not the parity array is idle and a track in the parity array needs a rebuild is checked at machine step 130. If the parity array is not currently idle or there is no need for a track rebuild, then the operation returns over path 135 to the caller, such as the FIG. 5 illustrated selection method. When the parity array is idle with a rebuild need, then at machine step 131 a cylinder and one of its tracks are selected for rebuild. This selection uses the aforedescribed selection method. Following selection and seeking the transducer (not shown) to the selected track, machine step 132 rebuilds the track contents. Machine step 133 then checks to see if the parity array is still idle, if yes steps 131 and 132 are repeated until either no more rebuilds are needed or the parity array becomes busy. At that point other machine operations ensue.

FIG. 11 illustrates the opportunistic rebuild method. A track access operation is initiated over path 139. For purposes of illustration, the ensuing machine step 140 is an attempted read from the track to be accessed. Any access operation may be used, such as write, format write, verify, erase and the like. Assuming a read operation, machine step 141 determines whether or not a hard (uncorrectable) error has occurred. Included in the machine step 141 operation is detection that the device containing the accessed track is already known to have failed and a rebuild is pending or already in progress for that device. If the read produced no hard error, i.e. no errors detected or a corrected error occurred, machine step 142 checks the quality of the read-back operation. Since a corrected error may not be repeated, machine step 142 may not invoke the opportunistic rebuild method, choosing to proceed as OK over path 143 to other operations. If the quality requirements are not met, such as determinable by evaluating read signal quality, the type and extent of the corrected error, systems requirements (desired quality of the redundancy in the array) and the like, the opportunistic rebuild is initiated (the NO exit from step 142). Machine step 144 effects a rebuild of the currently accessed track from either machine step 141 detecting a hard error or from machine step 142. Rebuilding follows the above-described method of rebuild. Upon completing rebuilding the accessed track data in machine step 144, in machine step 145 whether or not the parity array is idle is checked. If the parity array is not idle, then other operations are performed; if the parity array is idle, then machine step 146 rebuilds a next track. Such rebuild includes selecting a cylinder and track followed by the actual rebuild method. Machine steps 145 and 146 repeat until either no more rebuilds are needed (bit maps are all zeros) or the parity array becomes active.

While the invention has been particularly shown and described with reference to preferred embodiments thereof, it will be understood by those skilled in the art that various changes in form and details may be made therein without departing from the spirit and scope of the invention.

What is claimed is:

1. In a machine-effected method of rebuilding data in a redundant array of a plurality of disk drives which includes an error affected disk drive, including the machine-executed steps of:

detecting and indicating that a one of the disk drives is error affected;

measuring and indicating a rate of machine operations of the array;

establishing a rate of rebuilding data affected by the error affected disk drive which rate is predetermined inversely proportional to said measured and indicated rate of accesses;

intermediate predetermined ones of said accesses which is in said inverse proportion, rebuilding data in a predetermined one of the disk drives for replacing data in error.

2. In the machine-effected method set forth in claim 1 further including the machine-executed steps of:

accessing the error affected disk drive; during said access rebuilding data affected by said error.

3. In the machine-effected method set forth in claim 1 further including the machine-executed steps of:

detecting that the array of disk drives has no current access; and rebuilding data affected by said error affected disk drive beginning upon said detection of no current access.

4. In a machine-effected method of automatically maintaining fault tolerance in a parity array of disk drives including the machine-executed steps of:

detecting and indicating a degradation of the fault tolerance of the parity array;

evaluating and indicating the current information handling activity of the parity array;

establishing a plurality of data rebuild methods for the parity array for removing the fault tolerance degradation from the parity array; and analyzing the indicated current information handling activity of the parity array and selecting a one of the plurality of rebuild methods which effects a data rebuild without degrading performance of said current information handling activity more than a predetermined degradation level.

5. In the machine-effected method set forth in claim 4 further including the machine-executed steps of:

in said evaluating step, determining the rate of information handling activity and selecting a data rebuild rate in a predetermined inverse ratio to the determined rate of information handling activity; and establishing a one of the plurality of rebuild methods as a variable rate rebuild method which effects data rebuilding at said selected rebuild rate of a predetermined number of addressable error-affected data units in the parity array.

6. In the machine-effected method set forth in claim 5 further including the machine-executed steps of:

completing a data rebuild using said variable rebuild method;

detecting that the parity array is idle; and continuing the data rebuilding of additional ones of the addressable error-affected data units so long as the parity array is idle.

7. In the machine-effected method set forth in claim 5 further including the machine-executed steps of:

in said evaluating step, determining that the parity array is idle; and establishing a second one of the plurality of rebuild methods as an idle rebuild method to be selected whenever the parity array is idle and a rebuild need exists in the parity array.

8. In the machine-effected method set forth in claim 5 further including the machine-executed steps of:

performing a data area access operation in the parity array;

while performing the data area access operation, performing said detecting and indicating step for detecting and indicating that the data access operation is accessing a one of the addressable data units needing a data rebuild; and rebuilding at least the data unit being accessed.

[9. In a machine-effected method of automatically maintaining fault tolerance in a fault tolerant parity array of disk drives including the machine-executed steps of:

detecting that the parity array is idle;

detecting that the parity array fault tolerance is degraded and needs data rebuilding;

identifying data rebuild needs; and rebuilding the data at the identified rebuild needs during said detected idle times.]

10. In a machine-effected method of automatically maintaining fault tolerance in a fault tolerant parity array of disk drives including the machine-executed steps of:

indicating that fault tolerance of the parity array is degraded by a plurality of error-affected addressable data units of the parity array which respectively need data rebuilding to reestablish the fault tolerance;

performing a data area access operation to an addressable data unit in the parity array;

while performing the data area access operation, detecting and indicating that the data access operation is accessing a one of the error-affected addressable data units needing a data rebuild; and rebuilding the addressable data unit being accessed.

11. Apparatus having a redundant array of disk devices, the improvement including, in combination:

rebuild need evaluation means for detecting and indicating a degradation in the redundant array including indicating a one of the disk drives needs to have data rebuilt to such one disk drive;

access rate means for measuring and indicating a rate of machine operations of said array;

rebuild rate means coupled to said evaluation means and to said access rate means for responding to said indicated rebuild need and to said indicated operations rate for establishing and indicating a predetermined rate of rebuilding for the array for recovering from said degradation of fault tolerance; and rebuild means having a plurality of data rebuild effecting means and being coupled to said rebuild rate means and to said rebuild need means for effecting data rebuild in said one disk drive using a predetermined one of said plurality of data rebuild effecting means.

12. Apparatus having a redundant array of disk drives as set forth in claim 11, further including, in combination:

control means in the apparatus for controlling access to the disk drives in the redundant array and for detecting and indicating when the array is currently not being accessed for a data handling operation;

a first one of said rebuild effecting means being connected to said control means, to said rebuild rate means and to said rebuild need means for determining a rebuild can be scheduled and then activating the control means to give access to the redundant array to the first one of said rebuild effecting means for effecting a series of time space-apart rebuild operations at said predetermined rate.

13. Apparatus having a redundant array of disk drives as set forth in claim 12, further including, in combination:

said rebuild rate means including means or indicating a plurality of rebuild rates, said plurality of rebuild rates increasing in rate values in an inverse proportion to said indicated operations rate and said rate values corresponding respectively to predetermined ranges of said indicated machine operations rates; and predetermined rate means in said rebuild rate means for indicated said predetermined rate as one of said plurality of rebuild rates which corresponds to a current one of the indicated machine operations rate.

14. Apparatus having a redundant array of disk drives as set forth in claim 11, further including, in combination:

control means in the apparatus for controlling access to the disk drives in the redundant array and for detecting and indicating when the array is currently not being accessed for a data handling operation;

a second one of said rebuild effecting means being connected to said control means indicating the array is not being currently accessed to actuate the control means to give said second one rebuild effecting means access to the redundant array for starting a predetermined data rebuild in response to said not being accessed indication.

15. Apparatus having a redundant array of disk drives as set forth in claim 11, further including, in combination:

control means in the apparatus for controlling access to the disk drives in the redundant array and for detecting and indicating when the array is currently not being accessed for a data handling operation;

a third one of said plurality of rebuild effecting means being connected to rebuild need evaluation means and to said control means for receiving indication that a disk drive access is occurring in a given area of the array which needs a data rebuild indicated by said rebuild need evaluation means and responding to said received indication of said access to effect a data rebuild of a predetermined area of the redundant array which includes said given area.

16. Apparatus having a redundant array of disk drives as set forth in claim 11, further including, in combination:

control means in the apparatus for controlling access to the disk drives in the redundant array and for detecting and indicating when the array is currently not being accessed for a data handling operation and whether or not any pending access requests are currently pending;

a first one of said rebuild effecting means being connected to said control means, to said rebuild rate means and to said rebuild need means for determining a rebuild can be scheduled and then activating the control means to give access to the redundant array to the first one of said rebuild effecting means for effecting a series of time space-apart rebuild operations at said predetermined rate;

a second one of said rebuild effecting means being connected to said control means and being responsive to the control means indicating the array is not being currently accessed and there are no access requests pending to actuate the control means to give said second one rebuild effecting means access to the redundant array for starting a predetermined data rebuild in response to said not being accessed indication;

a third one of said plurality of rebuild effecting means being connected to rebuild need evaluation means and to said control means for receiving indication that a disk drive access is occurring in a given area of the array which needs a data rebuild indicated by said rebuild need evaluation means and responding to said received indication of said access to effect a data rebuild of a predetermined area of the redundant array which includes said given area; and each of said effecting means upon completing a predetermined data rebuild operation being responsive to the control means then indicating no current access or no pending access requests to initiate another predetermined data rebuild operation.

*17. The machine-effected method set forth in claim 4, further including:*

*in said evaluating step, determining whether the parity array is idle, and wherein*

*one or more of said selected rebuild methods effects a data rebuild at a first rate when the parity array is not idle, and effects a data rebuild at a second rate which is greater than said first rate when the parity array is idle.*

*18. In a machine-effected method of rebuilding data in a redundant array of disk drives which includes an error-affected disk drive, the machine-executed steps of:*

*detecting and indicating that one of the disk drives is error-affected;*

*measuring and indicating a rate of accesses to the array; and*

*rebuilding data affected by the error-affected disk drive at a rate which is inversely related to said measured and indicated rate of accesses, the rebuilding of data in the error-affected disk drive occurring during times intermediate certain of said accesses.*

*19. The machine-effected method set forth in claim 18, further including the machine-executed steps of:*

*performing an access to the error-affected disk drive; and*

*rebuilding data affected by said error-affected disk drive during said access.*

*20. The machine-effected method set forth in claim 18, further including the machine-executed steps of:*

*detecting that the array has no current access; and*

*rebuilding data affected by said error-affected disk drive in response to said detecting of no current access.*

*21. In a machine-effected method of automatically maintaining fault tolerance in a fault tolerant parity array of disk drives, the machine-executed steps of:*

*indicating that fault tolerance of the parity array is degraded by one or more addressable data units of the parity array which respectively need data rebuilding to reestablish the fault tolerance;*

*performing a data read operation in an addressable data unit in the parity array;*

*while accessing the parity array to perform the data read operation, detecting and indicating that one of the error-affected addressable data units needing a data rebuild is being accessed; and*

*rebuilding the addressable data unit being accessed.*

*22. An article of manufacture for use in a computer system, which system includes a redundant array of disk drives of which one or more disk drives may become error-affected, an access mechanism for reading and writing data to the disk drives of the array, and means to execute programs containing executable statements for controlling the reading and writing of data from and to the respective disk drives of the array,*

*said article of manufacture comprising a computer-readable storage medium having a computer program code embodied therein that is capable of causing the system to perform the steps of:*

*detecting and indicating that one of the disk drives is error-affected;*

*measuring and indicating a rate of accesses to the array; and*

*rebuilding data affected by the error-affected disk drive at a rate which is inversely related to said measured and indicated rate of accesses, the rebuilding of data in the error-affected disk drive occurring during times intermediate ones of said accesses.*

*23. The article of manufacture of claim 22, wherein the program code is capable, in addition, of causing the system to:*

*access the error-affected disk drive; and*

*rebuild data affected by said error during said access.*

*24. The article of manufacture of claim 22, wherein the program code is capable, in addition, of causing the system to:*

*detect that the array of disk drives has no current access; and*

*rebuild data affected by said error-affected disk drive while the array has no current access.*

*25. An article of manufacture for use in a computer system, which system includes a redundant array of disk drives of which one or more disk drives may become error-affected, an access mechanism for reading and writing data to the disk drives of the array, and means to execute programs containing executable statements for controlling the reading and writing of data from and to the respective disk drives of the array,*

*said article of manufacture comprising a computer-readable storage medium having a computer program code embodied therein that enables the system to automatically maintain fault tolerance in the parity array of disk drives by performing the steps of:*

*detecting and indicating a degradation of the fault tolerance of the parity array;*

*evaluating and indicating the current information handling activity of the parity array; and*

*analyzing the indicated current information handling activity of the parity array and selecting one of a plurality of available machine-executable rebuild methods which effects a data rebuild to remove the fault tolerance degradation of the parity array without degrading performance of said current information handling activity more than a predetermined degradation level.*

*26. The article of manufacture set forth in claim 25, wherein the program code is capable of causing the system to execute the further steps of:*

*determining, in said evaluating step, the rate of information handling activity and selecting a data rebuild rate in an inverse ratio to the determined rate of information handling activity; and*

*performing a one of the plurality of rebuild methods as a variable rate rebuild method which effects data rebuilding at said selected rebuild rate of a predetermined number of addressable error-affected data units in the parity array.*

*27. The article of manufacture set forth in claim 26, wherein the program code is capable of causing the system to perform the further steps of:*

*completing a data rebuild using said variable rebuild method;*

*detecting that the parity array is idle; and*

*continuing the data rebuilding of additional ones of the addressable error-affected data units while the parity array is idle.*

*28. The article of manufacture set forth in claim 26, wherein the program code is capable of causing the system to perform the further steps of:*

*determining that the parity array is idle in said evaluating step; and*

*performing a second one of the plurality of rebuild methods as an idle rebuild method to be selected whenever the parity array is idle and a rebuild need exists in the parity array.*

*29. The article of manufacture set forth in claim 25, wherein the program code is capable of causing the system to perform the further steps of:*

*performing a data access operation in the parity array;*

*while performing the data access operation, performing said detecting and indicating step for detecting and indicating that the data access operation is accessing a one of the addressable data units needing a data rebuild; and*

*rebuilding at least the data unit being accessed.*

*30. The article of manufacture set forth in claim 25, wherein the program code is capable of causing the system to perform the steps of:*

*in said evaluating step, determining whether the array is idle; and*

*in said selecting step, selecting at least one data rebuild method to effect a data rebuild at a first rate when the array is not idle, and to effect a data rebuild at a second rate higher than said first rate when the array is idle.*

*31. An article of manufacture for use in a computer system, which system includes a fault tolerant parity array of disk drives of which one or more disk drives may become error-affected, an access mechanism for reading and writing data to the disk drives, and means to execute programs containing executable statements for controlling the reading and writing of data from and to the respective disk drives of the array,*

*said article of manufacture comprising a computer-readable storage medium having a computer program code embodied therein for automatically maintaining fault tolerance in the array by causing the system to perform the steps of:*

*indicating that fault tolerance of the parity array is degraded by one or more error-affected addressable data units of the parity array which respectively need data rebuilding to reestablish the fault tolerance;*

*performing a data access operation to an addressable data unit in the parity array;*

*while performing the data access operation, detecting and indicating that the data access operation is accessing a one of the error-affected addressable data units needing a data rebuild; and*

*rebuilding the addressable data unit being accessed.*

*32. The article of manufacture set forth in claim 31, wherein:*

*the data access is a read operation, and*

*the program code causes the system to rebuild an addressable data unit in need of rebuilding while said data unit is being accessed to effect the read operation.*

*33. A controller for automatically maintaining fault tolerance in a parity array of disk drives having respective access mechanisms for reading and writing data in the form of addressable data units in the disk drives of the array, said controller comprising:*

*means for detecting a degradation of the fault tolerance of parity array and providing an indication thereof;*

*means for evaluating the current information handling activity of the parity array and providing an indication of such activity;*

*a plurality of rebuild-effecting means for removing the fault tolerance degradation of the parity array in accordance with different rebuild schedules; and*

*means responsive to said fault tolerance degradation and information handling-activity indications for rendering operative a one of the rebuild-effecting means to cause at least one of the access mechanisms to effect a data rebuild without degrading performance of said current information handling activity more than a predetermined degradation level.*

*34. The controller of claim 33, wherein:*

*said evaluating means provides an indication of the rate of the current information handling activity of the parity array and establishes an indicated data rebuild rate for addressable error-affected data units in the parity array, which rebuild rate is inversely related to the indicated activity rate; and*

*one of said rebuild effecting means is responsive to said indicated data rebuild rate to cause at least one of said access mechanisms to effect a rebuilding of addressable error-affected data units at said indicated data rebuild rate.*

*35. The controller of claim 34, wherein:*

*said evaluating means provides an indication when the parity array is in an idle state; and*

*another of said rebuild effecting means is responsive to said idle state indication for causing at least one of the access mechanisms to continue the rebuilding of addressable error-affected data units upon completion of a rebuild of at least one error-affected data unit at said indicated data rebuild rate.*

*36. The controller of claim 34, wherein:*

*said evaluating means provides an indication when the parity array is in an idle state; and*

*another of said rebuild effecting means is responsive to said idle state indication for causing at least one of the access mechanisms to effect a rebuilding of addressable error-affected data units in the parity array whenever the parity array is idle and the fault tolerance of the array is degraded.*

*37. The controller of claim 34, wherein:*

*another of said rebuild effecting means includes means responsive to said indication of fault tolerance degradation for detecting and indicating when an access*

*mechanism of the parity array is accessing an error-affected data unit during a normal data access operation, and*

*means responsive to said normal data access indication for causing said access mechanism to rebuild the accessed error-affected data unit accessed during such normal data access operation.*

*38. In a machine-effected method of automatically maintaining fault tolerance in a redundant array of disk drives, the machine-executed steps of:*

*(a) detecting and indicating a degradation of the fault tolerance of the array;*

*(b) evaluating and indicating the current information handling activity of the array; and*

*(c) following steps (a) and (b),*

*analyzing the indicated current information handling activity of the array and selecting one of a plurality of available machine-executable rebuild methods which effects a data rebuild without degrading performance of said current information handling activity more than a predetermined degradation level.*

*39. The machine-effected method set forth in claim 38, further including the machine-executed steps of:*

*in said evaluating step (b), determining the rate of information handling activity and selecting a data rebuild rate in a predetermined inverse ratio to the determined rate of information handling activity; and*

*selecting a one of the plurality of rebuild methods as a variable rate rebuild method which effects data rebuilding at said selected rebuild rate of a predetermined number of addressable error-affected data units in the array.*

*40. The machine-effected method set forth in claim 39, further including the machine-executed steps of:*

*completing a data rebuild using said variable rebuild method;*

*detecting that the array is idle; and*

*continuing the data rebuilding of additional ones of the addressable error-affected data units so lone as the array is idle.*

*41. The machine-effected method set forth in claim 38, further including the machine-executed steps of:*

*in said evaluating step, determining that the array is idle; and*

*selecting a one of the plurality of rebuild methods as an idle rebuild method to be selected whenever the array is idle and a rebuild need exists in the array.*

*42. The machine-effected method set forth in claim 38, further including the machine-executed steps of:*

*performing a data area access operation in the array;*

*while performing the data area access operation, performing said detecting and indicating step for detecting and indicating that the data access operation is accessing a one of the addressable data units needing a data rebuild; and*

*selecting a one of the plurality of rebuild methods so as to carry out a rebuild of at least the data unit being accessed.*

*43. The machine-effected method of claim 38, wherein:*

*said evaluating step (b) determines when access requests to the array are pending and when the array is idle; and*

*in step (c), data is rebuilt at a first rate when the array is not idle, and is rebuilt at a second rate which is greater than said first rate when the array is idle.*

*44. A controller for automatically maintaining fault tolerance in an array of disk drives having respective access mechanisms for reading and writing data in the form of addressable data units in the disk drives of the array, said controller comprising:*

*means for detecting a degradation of the fault tolerance of the array and providing an indication thereof;*

*means for evaluating the current information handling activity of the array and providing an indication of such activity;*

*means responsive to said fault tolerance degradation and information handling-activity indications for rendering operative one of a plurality of available rebuild-effecting means to cause at least one of the access mechanisms to effect a data rebuild without degrading performance of said current information handling activity more than a predetermined degradation level.*

*45. The controller of claim 44, wherein:*

*said evaluating means provides an indication of the rate of the current information handling activity of the array and establishes an indicated data rebuild rate for addressable error-affected data units in the array, which rebuild rate is inversely related to the indicated activity rate; and*

*one of said rebuild effecting means is responsive to said indicated data rebuild rate to cause at least one of said access mechanisms to effect a rebuilding of addressable error-affected data units at said indicated data rebuild rate.*

*46. The controller of claim 45, wherein:*

*said evaluating means provides an indication when the array is in an idle state; and*

*one of said rebuild effecting means is responsive to said idle state indication for causing at least one of the access mechanisms to continue the rebuilding of addressable error-affected data units upon completion of a rebuild of at least one error-affected data unit at said indicated data rebuild rate.*

*47. The controller of claim 44, wherein:*

*said evaluating means provides an indication when the array is in an idle state; and*

*one of said rebuild effecting means is responsive to said idle state indication for causing at least one of the access mechanisms to effect a rebuilding of addressable error-affected data units in the array whenever the array is idle and the fault tolerance of the array is degraded.*

*48. The controller of claim 44, wherein:*

*one of said rebuild effecting means includes means responsive to said indication of fault tolerance degradation for detecting and indicating when an access mechanism of the array is accessing an error-affected data unit during a normal data access operation, and*

*means responsive to said normal data access indication for causing said access mechanism to rebuild the accessed error-affected data unit accessed during such normal data access operation.*

*49. The controller of claim 44, wherein:*

*said evaluation means provides an indication of whether or not the array is idle; and*

*at least one of said plurality of rebuild-effecting means causes at least one of the access mechanisms to effect a data rebuilding at a first rate when the array is not idle, and causes at least one of the access mechanisms to effect a data rebuild at a second rate higher than said first rate when the array is idle.*

*50. A data storage system, comprising:*

*a redundant array of disk drives each having respective access mechanisms for reading and writing data in the form of addressable data units stored on the disk drives of the array, and*

*a controller for said disk drives, said controller comprising*

*means for detecting a degradation of the fault tolerance of the array and providing an indication thereof;*

*means for evaluating the current information handling activity of the array and providing an indication of such activity;*

*means responsive to said fault tolerance degradation and information handling-activity indications for rendering operative one of a plurality of available rebuild-effecting means to cause at least one of the access mechanisms to effect a data rebuild without degrading performance of said current information handling activity more than a predetermined degradation level.*

*51. The data storage system of claim 50, wherein:*

*said evaluating means provides an indication of the rate of the current information handling activity of the array and establishes an indicated data rebuild rate for addressable error-affected data units in the array, which rebuild rate is inversely related to the indicated activity rate; and*

*one of said rebuild effecting means is responsive to said indicated data rebuild rate to cause at least one of said access mechanisms to effect a rebuilding of addressable error-affected data units at said indicated data rebuild rate.*

*52. The data storage system of claim 50, wherein:*

*said evaluating means provides an indication when the array is in an idle state; and*

*one of said rebuild effecting means is responsive to said idle state indication for causing at least one of the access mechanisms to continue the rebuilding of addressable error-affected data units upon completion of a rebuild of at least one error-affected data unit at said indicated data rebuild rate.*

*53. The data storage system of claim 50, wherein:*

*said evaluating means provides an indication when the array is in an idle state; and*

*one of said rebuild effecting means is responsive to said idle state indication for causing at least one of the access mechanisms to effect a rebuilding of addressable error-affected data units in the parity array whenever the array is idle and the fault tolerance of the array is degraded.*

*54. The data storage system of claim 53, wherein:*

*the rebuilding of addressable error-affected data units when the array is idle is performed at an associated rate, and*

*when the array is not idle, at least one of said rebuild-effecting means is rendered operative to cause at least one of the access mechanisms to effect data rebuilds at a rate lower than said associated rate.*

*55. The data storage system of claim 50, wherein:*

*one of said rebuild effecting means includes means responsive to said indication of fault tolerance degradation for detecting and indicating when an access mechanism of the array is accessing an error-affected data unit during a normal data access operation, and*

*means responsive to said normal data access indication for causing said access mechanism to rebuild the accessed error-affected data unit accessed during such normal data access operation.*

*56. A controller for automatically maintaining fault tolerance in an array of disk drives having respective access mechanisms for reading and writing data in the form of addressable data units in the disk drives of the array, said controller comprising:*

*a fault tolerance degradation detector;*

*an information handling activity evaluator; and*

*a selector responsive to said fault tolerance degradation detector and said information handling activity evaluator, said selector rendering operative one of a plurality of available rebuild-effecting mechanisms to cause at least one of the access mechanisms to effect a data rebuild without degrading performance more than a predetermined degradation level.*

*57. The controller of claim 56 wherein:*

*said information handling activity evaluator establishes an indicated data rebuild rate for addressable error-affected data units in the array; and*

*one of said rebuild effecting mechanisms is responsive to said indicated data rebuild rate to cause at least one of said access mechanisms to effect a rebuilding of addressable error affected data units at said indicated data rebuild rate.*

*58. The controller of claim 56 wherein:*

*said information handling activity evaluator provides an indication when the array is in an idle state; and*

*one of said rebuild effecting mechanisms is rendered operative by said selector in response to said idle state indication to cause at least one of said access mechanisms to effect a rebuilding of addressable error affected data units whenever the array is idle and the fault tolerance of the array is degraded.*

*59. A data storage system comprising:*

*a redundant array of disk drives, each having a respective access mechanism for reading and writing data in the form of addressable data units in the disk drives of the array; and*

*a controller for said array, said controller automatically maintaining fault tolerance in said array, said controller comprising;*

*a fault tolerance degradation detector;*

*an information handling activity evaluator; and*

*a selector responsive to said fault tolerance degradation detector and said information handling activity evaluator, said selector rendering operative one of a plurality of available rebuild-effecting mechanisms to cause at least one of the access mechanisms to effect a data rebuild without degrading performance more than a predetermined degradation level.*

*60. The data storage system of claim 59 wherein:*

*said information handling activity evaluator establishes an indicated data rebuild rate for addressable error-affected data units in the array; and*

*one of said rebuild effecting mechanisms rendered operative by said selector is responsive to said indicated data rebuild rate to cause at least one of said access mechanisms to effect a rebuilding of addressable error affected data units at said indicated data rebuild rate.*

*61. The data storage system of claim 59 wherein:*

*said information handling activity evaluator provides an indication when the array is in an idle state; and*

*one of said rebuild effecting mechanisms is rendered operative by said selector in response to said idle state*

*indication to cause at least one of said access mechanisms to effect a rebuilding of addressable error affected data units whenever the array is idle and the fault tolerance of the array is degraded.*

*62. In a machine-effected method of rebuilding data in a redundant array of disk drives which includes an error-affected disk drive, the machine-executed steps of:*

*detecting that one of the disk drives is error-affected;*

*measuring a rate of accesses to the disk drives; and*

*rebuilding data affected by the error affected disk drive at a rate which is inversely related to said measured rate of accesses, the rebuilding of data in the error-affected disk drive occurring during times intermediate of certain of said accesses.*

*63. An article of manufacture for use in a data storage system, which system includes a redundant array of disk drives of which one or more disk drives may become error-affected, an access mechanism for reading and writing data to the disk drives of the array, and processors for executing programs containing executable statements for controlling the reading and writing of data from and to the respective disk drives of the array,*

*said article of manufacture comprising computer-readable storage medium having computer program code embodied therein that is capable of causing the system to perform the steps of:*

*detecting that one of the disk drives is error-affected;*

*measuring a rate of accesses to the disk drives; and*

*rebuilding data affected by the error-affected disk drive at a rate which is inversely related to said measured rate of accesses, the rebuilding of data in the error-affected disk drive occurring during times intermediate of certain of said accesses.*

* * * * *